United States Patent
Jones

[15] 3,654,602
[45] Apr. 4, 1972

[54] AUTOMOBILE ANTI-THEFT ALARM AND CONTROL UNIT

[72] Inventor: James A. Jones, 2814 York Avenue, Cleveland, Ohio 44113

[22] Filed: Nov. 17, 1970

[21] Appl. No.: 90,297

[52] U.S. Cl..................................340/64, 340/276, 307/10
[51] Int. Cl..........................................................B60r 25/04
[58] Field of Search ..................340/63, 64, 65, 276; 307/10

[56] References Cited

UNITED STATES PATENTS

| | | | |
|---|---|---|---|
| 3,194,970 | 7/1965 | Claps | 340/64 X |
| 3,525,414 | 8/1970 | Copelan | 307/10 X |
| 3,569,931 | 3/1971 | Baxter | 340/63 X |

*Primary Examiner*—Alvin H. Waring
*Attorney*—Cushman, Darby & Cushman

[57] ABSTRACT

Apparatus for protecting a vehicle such as an automobile from theft and/or other improper use including a first double pole double throw switch, a relay having first and second normally open controlled switches and a second normally closed double pole, double throw switch. When the first switch is manually shifted to the protective position, the first switch electrically connects the primary winding of the ignition coil or the like to ground so that the vehicle cannot be started and also electrically connects the vehicle battery to the relay via the vehicle devices which operate off the battery so that if any of these devices are used while the first switch is in the protective position the relay is activated. The activation of the relay causes a latching current path to be completed in parallel with the vehicle devices so that the relay remains activated even if all vehicle devices are thereafter shut off, and further causes a noisemaker such as the vehicle horn to be connected to the battery to sound an audio alarm. Once activated the relay remains activated until the first or second switch is manually opened.

3 Claims, 1 Drawing Figure

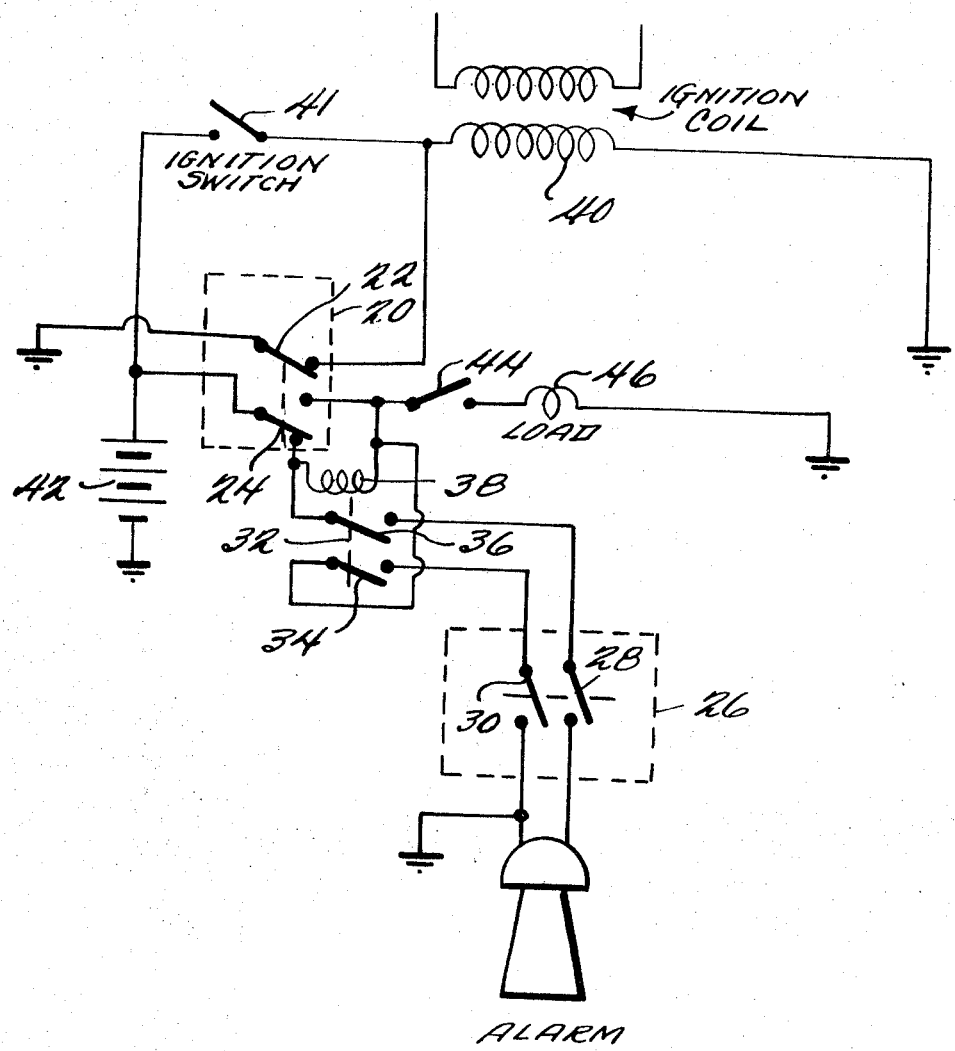

AUTOMOBILE ANTI-THEFT ALARM AND CONTROL UNIT

BRIEF DESCRIPTION OF THE PRIOR ART AND SUMMARY OF THE INVENTION

The invention relates to an apparatus for protecting a vehicle such as an automobile from theft and/or other improper use.

The theft and other misuse of vehicles such as automobiles are one of the major problems of society. Because of their mobility, value and availability, they are tempting both to the joy rider and professional who are both little hindered by most security devices with which vehicles are equipped. Locks can be easily picked and ignition systems circumvented.

In response to this problem, many different types of security devices have been developed to provide better protection against theft and/or other misuse. In some such devices, for example those shown in the U.S. Pat. Nos. to Hall 3,419,729 and Proctor 2,935,730, a hidden switch is provided in or on the vehicle which the operator can shift to an operative position when the vehicle is left unsupervised. When the switch is in this operative position, any attempt to start the vehicle or to operate any of the devices which normally operate off the car battery, such as the dome light or radio results in sounding an alarm, for example by operating the horn with which most vehicles are normally equipped.

While generally satisfactory, such devices in general have a number of drawbacks. First, it is desirable that any audio alarm sounded as a result of attempting to start the vehicle or use any of its electrical devices continue after the attempt ceases so as to frighten the thief and call attention to his crime. Further, it is desirable that the protective device prevent the vehicle from being started at all, even with the audio alarm wailing, so that a bold thief cannot drive off with the horn blowing.

The present invention relates to a novel apparatus of the type generally described above in which the vehicle cannot be started when a first switch is in a protective position and further any attempt to start the vehicle or operate any of the electrical devices of the vehicle results in an audio alarm being sounded. Further, the audio alarm, once initiated, continues even if thereafter all of the electrical devices on the vehicle are shut off. Once begun, the audio alarm can be terminated by manually opening a second switch whose location is preferably hidden.

These functions are accomplished, in the embodiment of the invention set forth below, by an apparatus adapted to be used with most if not all types of vehicles now employed and including a first double throw, double pole switch, a relay having first and second normally open controlled switches and a second normally closed double pole, double throw switch. When in a protective position the first switch electrically connects the primary winding of the ignition coil or other starting component to ground so that the vehicle cannot be started, and also electrically connects the vehicle battery or other source of electrical energy to the relay via the electrical devices of the vehicle, such as the radio, heater, air conditioner, etc., which operate off the battery so that if any of such devices are turned on while the first switch is in the protective position the relay is activated. When the relay is activated, one of its controlled switches completes a current path through the relay via the second switch so that the relay remains activated and the audio alarm operative even if all vehicle devices are thereafter shut off, and its other controlled switch completes a current path through a noisemaker, such as the automobile horn, also via the second switch. Once activated, the relay remains activated until the switch is manually opened. The specific connection of these elements, as discussed below, has been found to be particularly efficient and economic.

Many other objects and purposes of the invention will become clear from the following detailed description of the drawing.

BRIEF DESCRIPTION OF THE DRAWING

The drawing shows a schematic of the novel apparatus of this invention.

DETAILED DESCRIPTION OF THE INVENTION

Reference is now made to the drawing which shows a schematic of the novel invention of this application connected to the electrical system of a vehicle, such as a conventional automobile. As mentioned above the apparatus includes a first double throw, double pole switch 20 having individual switches 22 and 24, a second double throw, double pole switch 26 having individual switches 28 and 30 and a relay 32 having normally open, controlled switches 34 and 36 and a coil 38.

When the first switch 20 is manually shifted from the illustrated protective position to the inoperative position it normally occupies while the vehicle is in operation, individual switch 22 is opened so that the ignition coil 40, which is linked to ground by switch 22, can be energized to start the vehicle. Further when switch 20 is in its inoperative position, switch 24 connects battery 42 to the usual electrical devices of the vehicle, such as the radio, heater, courtesy lights, hood lights etc., which are schematically represented by a switch 44 and load coil 46, so that such devices can be normally used.

However when switch 20 is manually shifted into its illustrated protective position, switch 22 connects primary winding of ignition coil 40 to ground so that coil 40 cannot be energized and the vehicle started as long as switch 20 remains in the illustrated position. Thus any attempt to short ignition switch 41 creates a short circuit which rapidly drains the battery 42 so that no further attempt to start the car with battery 42 is possible. Further in the protective position, switch 24 connects one side of battery 42 to one side of relay coil 38 which is of a type which will operate on the voltage of battery 42. The other side of coil 38 is connected to ground via the electrical devices represented by switch 44 and load coil 46 and also to ground via normally open switch 34 and normally closed switch 28.

Thus, if any of the electrical devices of the vehicle are activated, even momentarily, a current path is completed through relay coil 38 via schematically represented switch 44 and load 46. The flow of current through coil 38 closes normally open switches 34 and 36. Closed switch 34 completes a latching path in parallel with the electrical devices so that even if operation of all devices is ended after relay 32 is activated, relay 32 remains activated until switch 28 is opened.

Further, the activation of relay 32 closes switch 36, thus completing a current path from battery 42 through noisemaker 50 via normally closed switch 30 so that noisemaker 50, which may be, for example, the vehicle horn, sounds an audio alarm. Noisemaker 50 continues to sound an audio alarm as long as relay 32 remains activated.

As long as relay 32 remains activated, switch 34 grounds the electrical devices of the vehicle so that they cannot be operated after relay 32 is activated. Relay 32, once activated, is deactivated by manually opening switches 28 and 30 and thus interrupting the latching circuit through coil 38 or by returning switch 20 to its inoperative position. Switch 20 may be located exterior to the vehicle and switch 26 interior or vice versa and either or both switches may be hidden and may be operable only with a key, if desired.

Many changes and modifications in the above described embodiments of the invention can of course be made without departing from the scope of the invention. Accordingly that scope is intended to be limited only by the scope of the appended claims.

What is claimed is:

1. Apparatus for protecting a vehicle having a battery, an ignition switch, ignition coil, for starting said vehicle with one side of a winding connected to ground and the other side connected to said battery via said ignition switch and a plurality of electrical devices operable off said battery comprising:

a relay with a coil having one side connected to one side of said devices and first and second controlled, normally open switches, a first double pole double throw switch having a first protective position connecting said other side of said winding to ground so that said vehicle cannot be started and a short circuit of said ignition switch connects said battery in a short circuit and connecting the other side of said relay coil to said battery so that whenever said first double pole switch is in said first position, and any of said devices are operated, current flows through said relay coil to cause said first and second controlled switches to close and a second position disconnecting said other side of said winding from ground and connecting said one side of said devices to one polarity of said battery, and a second double pole double throw switch having a first position connecting said one side of said devices and said one side of said relay coil to the other polarity of said battery via one of said controlled switches so that said devices cannot be operated when said one controlled switch is closed and said first double pole switch is in said first position and connecting said battery to a noisemaker via said first double pole switch and the other of said controlled switches so that when said first double pole switch is in said first position and said other controlled switch is closed said noisemaker sounds an alarm and a second position disconnecting said one side of said devices and said one side of said relay coil from said battery and disconnecting said noisemaker from said battery.

2. Apparatus as in claim 1 wherein said vehicle has a horn and said noisemaker includes said horn.

3. Apparatus as in claim 1 wherein said other polarity is ground.

* * * * *